United States Patent
Bytzek et al.

(10) Patent No.: US 10,625,571 B2
(45) Date of Patent: Apr. 21, 2020

(54) VEHICLE HEATER AND METHOD FOR MONITORING A VEHICLE HEATER

(71) Applicant: WEBASTO SE, Stockdorf (DE)

(72) Inventors: Dietmar Bytzek, Germersheim (DE); Thorsten Kabelitz, Munich (DE); Karl Goettl, Rosenheim (DE); Daniel Eckert, Stockdorf (DE); Fritz Wegener, Gilching (DE); Hans Rechberger, Baierbrunn (DE); Uwe Reinholz, Stahnsdorf (DE)

(73) Assignee: WEBASTO SE, Stockdorf (DE)

( * ) Notice: Subject to any disclaimer, the term of this patent is extended or adjusted under 35 U.S.C. 154(b) by 741 days.

(21) Appl. No.: 14/379,066

(22) PCT Filed: Feb. 15, 2013

(86) PCT No.: PCT/EP2013/053100
§ 371 (c)(1),
(2) Date: Aug. 15, 2014

(87) PCT Pub. No.: WO2013/121010
PCT Pub. Date: Aug. 22, 2013

(65) Prior Publication Data
US 2015/0014293 A1 Jan. 15, 2015

(30) Foreign Application Priority Data

Feb. 16, 2012 (DE) .................. 10 2012 202 379

(51) Int. Cl.
*B60H 1/22* (2006.01)
*H05B 1/02* (2006.01)
*H05B 3/26* (2006.01)

(52) U.S. Cl.
CPC ......... *B60H 1/2218* (2013.01); *H05B 1/0236* (2013.01); *H05B 3/262* (2013.01);
(Continued)

(58) Field of Classification Search
CPC ............... B60H 1/2218; H05B 1/0236; H05B 2203/003; H05B 2203/013; H05B 2203/023; H05B 3/262
(Continued)

(56) References Cited

U.S. PATENT DOCUMENTS

| 7,158,718 B2 * | 1/2007 | Russegger | F02M 31/125 219/207 |
| 2012/0217232 A1 * | 8/2012 | Hermann | B60H 1/2215 219/202 |
| 2012/0247641 A1 * | 10/2012 | Ruggiero | H05B 3/26 156/60 |

FOREIGN PATENT DOCUMENTS

| CN | 101098570 A | 1/2008 |
| DE | 10213407 A1 | 10/2003 |

(Continued)

OTHER PUBLICATIONS

International Search Report under dated May 8, 2013 in connection with PCT/EP20131053100.

*Primary Examiner* — Dana Ross
*Assistant Examiner* — Joseph W Iskra
(74) *Attorney, Agent, or Firm* — Quarles & Brady LLP (57) ABSTRACT

A vehicle heater (10) comprises a main body (12) carrying a non-intrinsically safe heat conductor layer (14), and a temperature monitoring device (16, 18, 20, 44) assigned to the heat conductor layer (14). The temperature monitoring device (16, 18, 20, 44) is designed to distinguish and to report at least the three following states: normal operation, reversible malfunction and irreversible malfunction.
Moreover, a method for monitoring a vehicle heater (10) is suggested in which the following states are distinguished and reported: normal operation, reversible malfunction and irreversible malfunction.

14 Claims, 3 Drawing Sheets

(52) U.S. Cl.
    CPC .. *H05B 2203/003* (2013.01); *H05B 2203/013* (2013.01); *H05B 2203/023* (2013.01)
(58) Field of Classification Search
    USPC .......................................................... 219/202
    See application file for complete search history.

(56) References Cited

FOREIGN PATENT DOCUMENTS

| | | |
|---|---|---|
| DE | 102005052274 A1 | 5/2007 |
| DE | 102008006017 A1 | 8/2009 |
| DE | 102011000719 * | 8/2011 |
| DE | 102011000719 A1 | 8/2011 |
| DE | 20 2011 102425 U1 | 11/2011 |
| EP | 1 349 428 A2 | 10/2003 |
| EP | 1361089 A2 | 11/2003 |
| JP | S5544362 U | 3/1980 |
| JP | H01104383 A | 4/1989 |
| JP | H02121410 U | 10/1990 |
| JP | 2007519166 A | 7/2007 |
| WO | 2008/150171 A1 | 12/2008 |
| WO | 2010/006279 A1 | 1/2010 |
| WO | WO2010008279 * | 1/2010 |

\* cited by examiner

VEHICLE HEATER AND METHOD FOR MONITORING A VEHICLE HEATER

CROSS-REFERENCE TO RELATED APPLICATIONS

This application represents the national stage entry of PCT International Application No. PCT/EP2013/053100 filed Feb. 15, 2013 which claims the benefit of German Patent Application 10 2012 202 379.8 filed Feb. 16, 2012, both of which are hereby incorporated herein by reference for all purposes.

The invention relates to a vehicle heater comprising a main body carrying a non-intrinsically safe heat conductor layer, a temperature monitoring device being allocated to the heat conductor layer.

The invention further relates to a method for monitoring a vehicle heater.

The main body may, for example, be a heat exchanger in both cases, particularly a metal/air and/or a metal/liquid heat exchanger.

In contrast to intrinsically safe heat conductor layers, for example PTC heat conductor layers, which are capable of autonomously preventing an excessive temperature increase by limiting the current flow, non-intrinsically safe heat conductor layers here refers to all types of heat conductor layers which do precisely not have this capability of avoiding an unsafe state in case of a defect.

Without being limited thereto, the non-intrinsically safe heat conductor layer may, for example, be provided to be supplied with comparatively high voltages (for example 250 volts of direct voltage), wherein excessively high voltages may, for example, be down-synchronised by pulse width modulation if this seems advantageous. Such voltages which are relatively high as compared to conventional on-board supply systems supplying 12 or 24 volts are frequently available anyway, for example in electric or hybrid vehicles. For example, electric vehicle heaters having a performance in the range of three to eight kilowatts can definitely be operated in such environments, while the area of application of the invention is, in turn, by no way limited to this range of performance or these vehicle types.

A vehicle heater comprising a heat conductor layer in the form of a non-intrinsically safe heating element is, for example, known from the patent specification EP 1 361 089 B1. According to this publication, three alternative sensors for a surface-specific detection of a heat radiation representing the heating element are provided for temperature monitoring, wherein the heating element is formed as a meander-shaped corrugated fin. One of these sensors is formed as a non-contact infrared sensor. Another sensor contacting the heating element is provided in the form of an electric resistance line integrated in the heating element. The third sensor suggested there is also located in the area of the heating element or integrated in it, and operates on the basis of a temperature-sensitive optic fibre. The three sensors send an associated measurement signal to a control unit which generates a control signal for safely de-energising or for reducing the output of the heating element in case of a defect. If a permanent defect occurs in this vehicle heater it has to be assumed that this permanent defect will also lead to overheating in the next operating cycle and thus (in the best case) to a renewed deactivation or to a renewed reduction of the output.

The invention is based on the object to further develop the generic vehicle heaters and the generic method for monitoring a vehicle heater so that the safety is improved.

This object is solved by the characteristics of the independent claims. Advantageous embodiments and further developments of the invention will emerge from the dependent claims.

What is suggested is, in the first place, a vehicle heater comprising a main body carrying a non-intrinsically safe heat conductor layer, wherein a temperature monitoring device is allocated to the heat conductor layer. The temperature monitoring device is designed so that it distinguishes at least the three following states: normal operation, reversible malfunction and irreversible malfunction, and reports them as a signal here. A normal operation of the vehicle heater may, for example, be assumed at a temperature of up to 150° C. In case of a reversible malfunction which may, in case of a water or liquid heating device, for example be caused by a lack of liquid or by a stagnant liquid, the temperature will rise above the value of 150° C. referred to as an example so that, for example, when a temperature of 180° C. is reached, a temporary deactivation the heat conductor layer or at least a reduction of the output may be induced. An irreversible malfunction may, for example, be given if, in extremely rare cases, a smouldering spot or an arc ignition occurred. Such rare events will generally only lead to local, however, extremely intense overheating in which, for example, temperatures in the range of 1000° C. can be reached. By distinguishing between the three mentioned states it is, for example, possible to retrieve the last reported condition prior to a renewed activation, i.e. a new operating cycle of the vehicle heater, and to prevent a renewed activation in case of an irreversible malfunction so that the vehicle heater remains permanently deactivated in such a case until a replacement or repair has taken place. The safety is significantly improved thereby since particularly irreversible defects may lead to renewed, extremely intense, at least local overheating if the heating device is activated again.

It may be contemplated that, in the vehicle heater, the temperature monitoring device comprises a sensor element detecting local temperatures for detecting reversible malfunctions. This sensor element may, for example, be a conventional PTC or NTC sensor element. Such sensor elements are capable of very precisely detecting the local temperatures, partly within a range of a few ° C. They are therefore, for example, particularly suitable for detecting the temperature increase from 150° C. to 180° C. referred to above as an example.

It is further possible that, for detecting irreversible malfunctions, the temperature monitoring device comprises a sensor layer allocated to the heat conductor layer at least in sections. This sensor layer is then, preferably, at least capable of reliably and rapidly detecting local and very intense overheating of the heat conductor layer as will occur, for example, in case of the mentioned smouldering spots or electric arcs. The sensor layer is preferably disposed above or below the heat conductor layer here. For example, the sensor layer may more or less completely cover the heat conductor layer (connecting areas and the like may be left open, if required). Since a sensor layer is, in the broadest sense, always an, at least in sections, planar layer, for example, also a sensor layer consisting of one or more (possibly very narrow) strips is feasible. The sensor layer may, for example, follow the pathway of a heat conductor layer arranged in a meandering form here, wherein, however, it preferably fully covers the heat conductor layer (as mentioned, connecting areas may be left open, if required), or the sensor layer may cover larger areas of the main body. For example, the sensor layer may be placed on a meander-shaped heat conductor layer as a sensor layer rectangular in the top view. Here, both solutions in which the sensor layer is disposed directly above the heat conductor layer so that the sensor layer contacts the heat conductor layer at least in sections, and solutions in which at least one intermediate layer is provided are an option. It has proven particularly effective that the sensor layer is conditioned so that its resistance or impedance already changes significantly in case of local overheating. With the aid of such a planar sensor layer it is, for example, possible to reliably detect local overheating before the abovementioned sensor element can detect a local temperature increase at its mounting position.

At least in some cases it is considered advantageous that the sensor layer is formed with the aid of a thermal spraying method. As spraying methods, particularly thermal spraying methods are an option. With the deployment of thermal spraying methods sensor layers can be produced without the main body being exposed to the temperatures common in burning-in processes. Such a spraying of sensor layers can be implemented at low costs comparable to those of burning-in processes, however, it limits the requirements imposed on the temperature tolerance of the main body used (or on the materials already carried by the main body) significantly less. Owing to the use of a spraying method for the main body, therefore, also materials are contemplable which would melt at the temperatures common in burning-in processes or the material characteristic or which associated with the intended application would be changed to the negative in any other way. The main body may, for example, fully or partly consist of aluminium owing to the use of an appropriate spraying method. Of course a multitude of other materials is also contemplable for the main body, these being materials exhibiting good heat conducting characteristics in many cases. Only by way of example aluminium alloys, glass and ceramics are made reference to in this connection. As examples of contemplable thermal spraying methods plasma spraying methods, cold gas spraying methods or flame spraying methods should be mentioned. In some cases it may be advantageous to also form other components of the vehicle heater, for example the heat conductor layer, by deploying a thermal spraying method. Presently, cold gas plasma spraying methods and suspension flame spraying methods are considered particularly well suited thermal spraying methods. Cold gas spraying involves a gas, for example nitrogen, being accelerated to high velocities, wherein particles transported with the gas at a high velocity (for example a multiple of the speed of sound) impinge on the main body or a substrate carried by it and form a dense, tightly adhering layer due to the high kinetic energy. In the course of suspension flame spraying first a suspension containing the particles to be sprayed on is prepared to then inject this suspension into a flame. In the process the liquid will, at least partly, preferably completely, vaporise, and (in the ideal case) only the respective particles will impinge on the target surface, whereby dense layers can be produced. In any case, what the contemplable methods for spraying on the sensor layer have in common here is that the main body does not have to be exposed to the high temperatures which are the standard in burning-in processes. In this connection it may, for example, be contemplated that the main body is only exposed to temperatures of less than 800° C., less than 650° C., or even less than 500° C. It is comprehensible that the number of materials usable for the main body (and/or any other components already disposed on it) will increase the lower the temperatures can be kept. In this connection it should be clear that the formulation "exposed to temperatures" is not to imperatively mean that the entire main body is supposed to or has to assume this temperature for this reason. Rather, the only thing relevant is that the main body is not, even in sections, exposed to temperatures which might cause damage to it. Depending on the properties of the main body (size, thermal conductivity, etc.) it may therefore, in some cases, for example, well be possible that the main body already carries components (for example electric or other components) which can only withstand significantly lower temperatures than 500° C., for example only 100° C. or even less, in areas not directly exposed to the spraying process. It may be contemplated that the sensor layer is produced with the aid of a powder, wherein powder particles of the powder are present in an agglomerated form or are brought into an agglomerated form, and wherein the non-agglomerated powder particles have an average grain size d50 of less than 20 µm, preferably less than 10 µm. With regard to the standard definition of the average grain size d50 which is meant here the applicable ISO 9276-2 is made reference to should the necessity of an explanation in this respect arise. For example, barium titanate powder which may, in some cases, be contemplable for producing the sensor layer, typically has a crystal size of less than 10 µm (for example, from 2 µm to 8 µm or from 4 µm to 5 µm). This particle size may be too small for some thermal spraying methods (such as, for example, plasma spraying methods) since it may lead to clogging of openings of the spray gun used in this method (or any other component of the device used for spraying). However, if a plurality of powder particles is present in an agglomerated form, for example embedded in a wrapping material, clogging of the openings of the spray gun may be avoided. In the agglomerates a plurality of powder particles may respectively be combined with the wrapping material which may, for example, comprise a plastic material such as polyvinyl alcohol as a component. Since the agglomerates are, at least in the vast majority of cases, larger than individual powder particles, clogging of the spray gun (or any other component of the device used for spraying) can therefore be avoided, at least in many cases. Of course the production and use of agglomerates is not limited to barium titanate powder. Rather, this technique can be used for any powder having excessively small powder particles which is contemplable within the scope of the invention. For the sprayed-on sensor layer as a whole to have the desired electric (or optical or other) characteristics it may be reasonable to adequately condition the wrapping material used for forming the agglomerates. For example, if altogether a certain specific electric conductivity is to be obtained the wrapping material should preferably have a specific electric conductivity which is about at least as high as the specific electric conductivity of the powder particles (at a normal operating temperature of the vehicle heater) as long as the agglomerates are not destroyed during spraying or the wrapping material remains, at least partly, a constituent of the sprayed-on sensor layer. However, the destruction of the agglomerates or the removal at least part of the wrapping material can also be specifically supported so that the properties of the sensor layer are (at least to a large extent) determined by the property of the powder particles. To this end suitable thermal, chemical and/or physical processes or after-treatment steps may be carried out as soon as the agglomerates have passed the sections which tend to clog. If a plurality of powder grains has to be brought in an agglomerated form first, for example, the following approach may be taken for this purpose: In a first step the appropriate material may be provided in its original consistency. In a second step then a conversion into a solid material is effected, particularly by means of sintering. Subsequently the solid material is pulverised by crushing the solid material. Thereafter the powder particles can be agglomerated by applying a binder system as well as a following drying and burning-out of the binder. It is also possible to pulverise the powder particles with the aid of a granulating process. For example, if granulated perowskite powder having a predetermined average grain size d50 is to be used the following approach may be taken: In a first process stage weighing and mixing, dissolving the salts in acid, precipitating by means of an alkaline solution, filtering as well as washing and drying are carried out. In a second process stage then a heat treatment for a phase reaction and/or conversion can be carried out. In a third process stage then wet grinding to the desired grain size may be carried out, wherein fractioning by means of screening or sieving, a control of the finished powder material and/or processing of residual amounts may be carried out in a fourth process stage. Particularly in cases in which the main body and components possibly already carried by it have a sufficient heat resistance the common burning-in processes may of course also be applied as an alternative to form the sensor layer (or other layers).

It may be contemplated that the sensor layer comprises a resistor or impedance characteristic including a positive temperature coefficient, at least in sections. This approach is particularly reasonable if the sensor layer has an elongated shape with two end sections between which a measurement signal is picked up to monitor the sensor layer for currents appearing in its longitudinal direction (or imposed) currents. The mode of operation may then be similar to the use of a PTC resistance conductor because, as a result of the series connection character of such an elongated extension, a sufficient heating of a comparably short length section will already be sufficient to increase the total resistance (or the total impedance) so that a local exceedance of a temperature threshold can reliably be detected. Exceedances of the temperature threshold occurring across larger length sections or even across the entire length can of course reliably be detected all the more in this way.

An example for obtaining a resistance characteristic with a positive temperature coefficient is the use of the abovementioned barium titanate powder, wherein the relatively inexpensive barium titanate is preferably doped with lead.

However, it is also possible that the sensor layer comprises, at least in sections, a resistance or impedance characteristic with a negative temperature coefficient. The provision of a negative temperature coefficient is particularly contemplable if the sensor layer is, in the broadest sense, an, at least in sections, planar layer which is to be monitored for current flows in the direction of its (possibly respective) surface normal. For example, also a sensor layer consisting of one or more (possibly extremely narrow) strips is to be understood to be a planar sensor layer here, for example also a layer consisting of strips in which the strips are wound around a cylinder surface several times and in different heights so that a multitude of (differential) surface normals emerge. Normally, the top and the bottom side of the layer having a negative temperature coefficient will respectively be provided with a likewise planar electrode for tapping a measurement signal. Such a sensor layer may be regarded as a parallel connection of a multitude of resistors or impedances (capacities) so that even a local exceedance of a temperature threshold will lead to a reliably detectable decrease of the total resistance (or the total impedance). Exceedances of the temperature threshold affecting larger surface sections or even the entire surface can of course also be reliably detected in this way. Likewise, for example, also a local flashover or a local arc formation between the electrodes can be detected or, in the ideal case, predicted and thus avoided. For example, in cases in which exclusively the detection of flashovers is concerned, also embodiments are conceivable in which the sensor layer is formed by a planar insulator layer comprising contact layers provided on its top and bottom side. Insofar, the term negative temperature coefficient is to be understood in the broadest sense here. To form a sensor layer having a negative temperature coefficient in the classical sense, for example, materials like silicon dioxide, silicon carbide, aluminium oxide, titanium oxide and other ceramic materials may be used. For example, in case of a ceramic glass, it may be contemplated that it contains one or more alkali metals, for example in a proportion of up to ten weight percent. It may also be contemplated that the ceramic glass is doped with zirconium oxide, zirconium silicate, quartz, titanium oxide and/or zinc oxide. The percentage of the doping may, for example, amount to up to three weight percent here.

It may be advantageous that the temperature monitoring device signals a normal operation as long as a first temperature threshold depending on the temperature of a medium to be heated is not exceeded. In case of a water or liquid heater it may, for example, be contemplated that a normal operation is assumed at a medium temperature of, for example, $-40°$ C. as long as, for example, temperatures in the range from $-40°$ C. to $100°$ C. are measured in the area of the vehicle heater, particularly by the abovementioned sensor element. If the medium temperature is, for example, $75°$ C. a normal operation may be assumed as long as, for example, temperatures in the range of $-40°$ C. to $150°$ C. are measured.

At least in some embodiments of the vehicle heater according to the invention it may be contemplated that the temperature monitoring device comprises a controller programmable or operable with software and switching components operating independent of the software and designed so as to carry out an emergency measure independent of the software in case of the occurrence of at least one of the mentioned malfunctions. As an emergency measure particularly a reduction of the heat output is contemplable, if required to zero. Further, the switching components may be designed to supply a suitable signal on the basis of which the controller identifies that the switching components have detected a malfunction to the controller in case of the execution of an emergency measure. Preferably the controller is also informed which type of malfunction (reversible or irreversible) has occurred by this signal. Such a solution may be contemplated for safety reasons because in this way at least one of the safety options (for example irreversible defect, detected by means of the planar sensor) is not or not fully realised by software but fully or partly by means of software-independent hardware. In this way, for example, a malfunction caused by a software error can be avoided because a certain independence from the software is established. The switching components may, in this case, be designed so that they detect one or more of the states to be distinguished according to the invention. Here, solutions are contemplable in which the switching components are provided redundantly together with functions also realised by software, or also solutions in which functions realised by the switching components are not additionally realised by software. If, for example, all states to be distinguished according to the invention can be detected independent of the software by associated switching components it is contemplable that only the, according to the invention, preferred identification function, i.e. the prevention of a renewed activation as a result of the presence of a specific signal, is implemented with the aid of the controller and associated software. However, it is also contemplable that software-independent but memory-capable components are used for this purpose, wherein memory-capable is to be understood to mean that even an interruption of the power supply will not lead to an occurring malfunction being forgotten later on here. In this context, the switching components may perform functions such as comparing the sensor values with one or more hardwired values and deactivating (emergency measure) when the value is exceeded under inclusion of, for example, an operational amplifier. The provision of such switching components may be reasonable not only on account of software errors which can hardly be completely excluded, but also, for example, if the software-assisted controller is also responsible for other tasks so that it is not always available or not always available in time.

Furthermore, a method for monitoring a vehicle heater is suggested in which the following states are distinguished and reported: normal operation, reversible malfunction and irreversible malfunction. As a result the advantages and properties explained above in connection with the vehicle heater emerge in an analogous or similar manner so that the associated explanations in connection with the vehicle heater are referred to in this place for avoiding repetitions. It is expressly emphasised that all characteristics discussed in connection with the vehicle heater may be important for the method individually or in any combination and in an analogous manner even if these characteristics were not claimed so far within the scope of the method.

Within the scope of the method it may also be contemplated that the condition of a reversible malfunction is identified with the aid of a sensor element detecting local temperatures as already described above in connection with the vehicle heater.

The same applies to the detection of the condition of an irreversible malfunction with the aid of a sensor layer which is, at least in sections, assigned to the heat conductor layer.

From the above it becomes obvious that a basic idea of the invention resides in that a sensor element only measuring locally but on the other hand precisely, for example a PTC or NTC sensor, is used for detecting a normal state as well as for detecting reversible malfunctions associated with relatively minor deviations from the normal temperatures. Incidentally a planar sensor layer is allocated to the heat conductor layer which does not imperatively have to provide particularly exact measurement values but has to be capable of rapidly and reliably detecting extreme overheating (caused, for example, by smouldering points or electric arcs) occurring in any place in the heat conductor layer even if such overheating may not (yet) be detectable by the more precise sensor element at its mounting position.

The invention will now be explained by way of example with the aid of particularly preferred embodiments with reference to the appended drawings in which:

In the drawings, the same numerals designate identical or similar components which are, for avoiding repetitions, at least partly not explained more than once.

Figure 1:
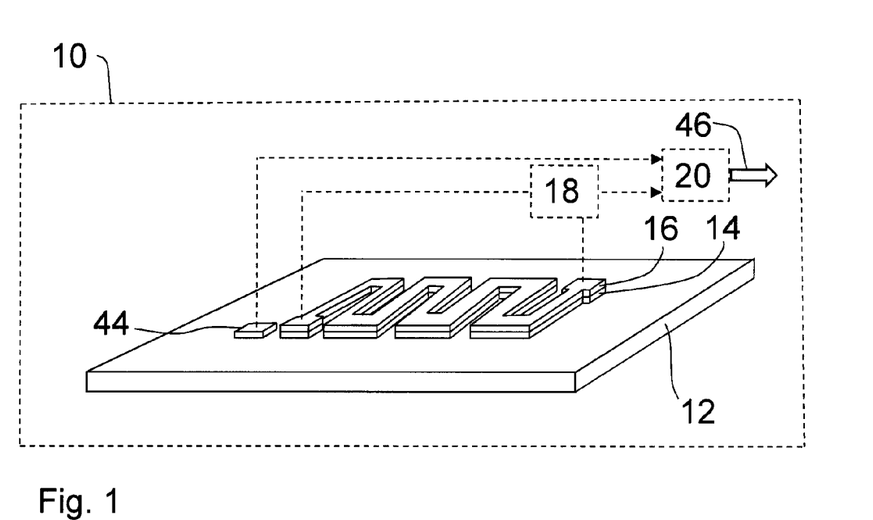
FIG. 1 shows a schematic, partly perspective illustration of a first embodiment of a vehicle heater which, at the same time, illustrates the monitoring method.

FIG. 1 shows a schematic, partly perspective illustration of a first embodiment of a vehicle heater 10, and at the same time it illustrates the monitoring method.

The vehicle heater 10 shown in FIG. 1 as well as all other vehicle heaters described below may be both air heaters or so-called water heaters for, for example—and without being limited thereto—electric or hybrid cars. Air heaters differ from so-called water heaters in that, in air heaters, the air flow to be heated is directly guided along a heat exchanger of the air heater device, while in the so-called water heaters a liquid, usually a mixture of water—therefore the name—and an antifreeze liquid, for example glycol, is first lead over a heat exchanger of the water heating device to guide the heat to the desired place with the aid of the fluid and of another heat exchanger.

The vehicle heater 10 altogether only schematically shown as a block in FIG. 1 comprises a main body 12 which is a heat exchanger in this case. Depending on the type of vehicle heater this heat exchanger 12 is provided for heating air or a liquid for which purpose the heat exchanger 12 may comprise ribs (not shown) or similar means for enlarging the surface effective for the heat exchange on its bottom side.

In the production of the vehicle heater 10 shown in FIG. 1 the surface of the heat exchanger 12 was provided with a non-intrinsically safe heat conductor layer 14, namely with the aid of a thermal spraying method. The direct application of the heat conductor layer 14 onto the heat exchanger 12, i.e. the omission of an intermediate insulating layer, is, in general, only reasonable if the heat exchanger 12 is made of a material which has a distinctly lower electric conductivity than the heat conductor layer 14. In operation, the heat conductor layer 14 is connected to a voltage source (not shown) which may, for example, be a direct voltage source which can be down-synchronised to 250 volts by pulse width modulation, if required. To this end the heat conductor layer has to be appropriately contacted at its end sections (relative to its elongated extension direction) which is at the discretion of the person skilled in the art and is not shown either.

Adjacent to the heat conductor layer 14, a sensor element 44 is provided on the surface of the heat exchanger 12 which may, for example, be formed by a PTC or NTC sensor. The sensor element 44 is capable of taking a comparably exact measurement of the temperature at its mounting position and of reporting the measured temperature to a controller 20.

A sensor layer 16 having a positive temperature coefficient in case of the embodiment of FIG. 1 was sprayed onto the heat conductor layer 14 with the aid of a thermal spraying method so that, at least by tendency, a PTC characteristic emerges for the sensor layer 16.

In practice the use of a thermal spraying method may possibly lead to the emergence of a configuration in which the material of the sensor layer 16 extends even beyond the edge sections of the heat conductor layer 14 at least in sections or in which the heat conductor layer 14 is even more or less completely buried under the sensor layer 16 instead of the schematically shown, exactly sandwich-like layer composition.

If the sensor layer 16 is provided directly on the heat conductor layer 14 without the use of an insulating layer as shown in FIG. 1 the electric conductivity of the sensor layer 16 has to be selected so that it is (considerably) lower for normal operating temperatures than the electric conductivity of the heat conductor layer 14 to ensure a proper operation of the vehicle heater 10.

During the operation of the vehicle heater 10 the measuring device 18 monitors the temperature-dependent resistance of the sensor layer 16, for example by applying a preferably constant voltage to the end sections of the sensor layer 16 as indicated by the broken lines and by detecting the resulting current flow, for example via a shunt resistor which may be a component of the measuring device 18. If now, for example, a local but extreme overheating to, for example, 1000° C., occurs in the area of the heat conductor layer 14 as a result of a smouldering point or arc ignition this will, in case of an appropriate conditioning of the sensor layer 16, lead to its overall resistance increasing so that this can be reliably detected by the measuring device 18 due to its dominant series connection characteristics in case of a positive temperature coefficient.

The sensor element 44, the sensor layer 16, the measuring device 18, and a controller 20 together form a temperature monitoring device capable of distinguishing the three following states and of reporting them as a signal 46: normal operation, reversible malfunction and irreversible malfunction. If the sensor element 44, for example, reports a normal temperature in the range of up to, for example, 150° C., the controller will assume a normal operation and transmit a corresponding signal 46. If the sensor element 44, for example, reports an unpermitted temperature increase to 180° C. the controller will assume a reversible malfunction and transmit a corresponding signal 46. Such a reversible malfunction could, in case of a water or liquid heating, for example be caused by lacking or immobile liquid. The controller 20 will temporarily deactivate the heat conductor layer 14 or at least reduce the heat output in such cases. As soon as the sensor element 44 reports a normal temperature again the heat output can, usually, be increased again. Preferably irrespective of what the sensor element 44 is just reporting the controller 20 will assume an irreversible malfunction if the measuring device 18 has only once reported extreme overheating in the area of the heat conductor layer 14 detected by the sensor layer 16. Therefore the signal from the measuring device 18 preferably has priority over the signal from the sensor element 44 because extreme local overheating in any area of the heat conductor layer 14 will possibly not have any effect as yet at the mounting position the sensor element 44. Such extreme overheating in the area of the heat conductor layer 14 will, however, suggest the occurrence of, for example, a smouldering point or even an electric arc. In such a case permanent damage has to be assumed which is why the heating device should not be activated again for safety reasons but has to be repaired or exchanged first. Therefore, the controller 20 will generate an appropriate signal 46 in such cases which indicates an irreversible malfunction, in which case a renewed activation will be prevented. The controller 20 does not have to be exclusively allocated to the monitoring device. For example, is contemplable that the controller 20 controls or regulates the operation of the entire vehicle heater, or that the functions critical for the monitoring device are performed by a controller 20 which is present in the vehicle anyway.

Figure 2:
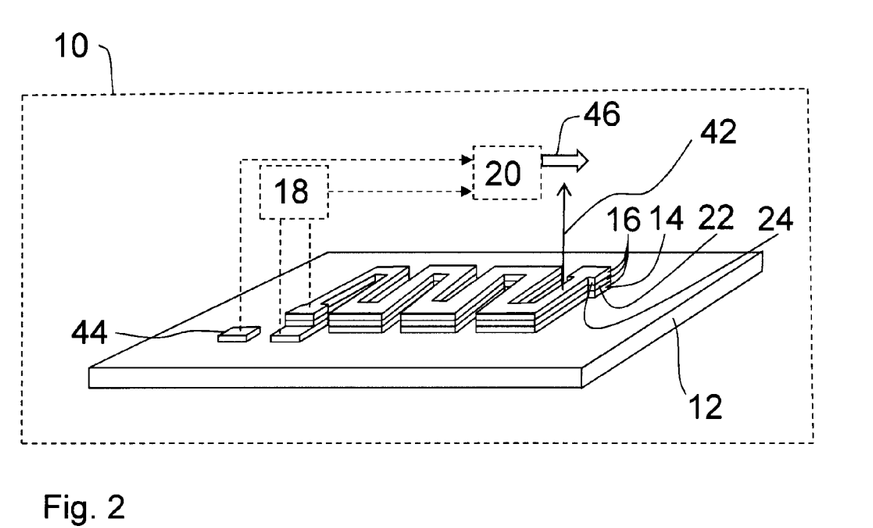
FIG. 2 shows a schematic, partly perspective illustration of a second embodiment of a vehicle heater which, at the same time, illustrates the monitoring method.

FIG. 2 shows a schematic, partially perspective illustration of a second embodiment of a vehicle heater 10, and, at the same time, it illustrates the monitoring method.

In this embodiment too the heat conductor layer 14 is directly sprayed onto the main body of the vehicle heater 10 formed by a heat exchanger 12. The vehicle heater according to FIG. 2, however, differs from the vehicle heater according to FIG. 1 in that the sensor layer 16 comprises three components in this embodiment. Namely, the heat conductor layer 14, which, in this case, is, at the same time, part of the sensor layer 16 in addition to its function as heating conductor. A layer 22 having a negative temperature coefficient sprayed onto the heat conductor layer 14 by thermal spraying and an electrically conducting contact layer 24 applied to the layer 22. If, due to an irreversible malfunction anywhere in the area of the heat conductor layer 14, extreme heating to, for example, 1000° C. occurs, this will, in case of an appropriate conditioning of the layer 22 having a negative temperature coefficient result in that its overall resistance or its overall impedance will considerably decrease due to its parallel connection character dominating in case of a negative temperature coefficient. This can be reliably detected by the measuring device 18. For this purpose, the measuring device 18 is, in this case, connected between the heat conductor layer 14 additionally serving as an contact layer and provided the contact layer 24 provided above the layer 22 having the negative temperature coefficient as indicated by the broken lines. The measuring device 18 may, in this way, similarly to the way described in connection with the embodiment according to FIG. 1, reliably detect an irreversible malfunction and supply an associated signal to the controller 20.

Figure 3:
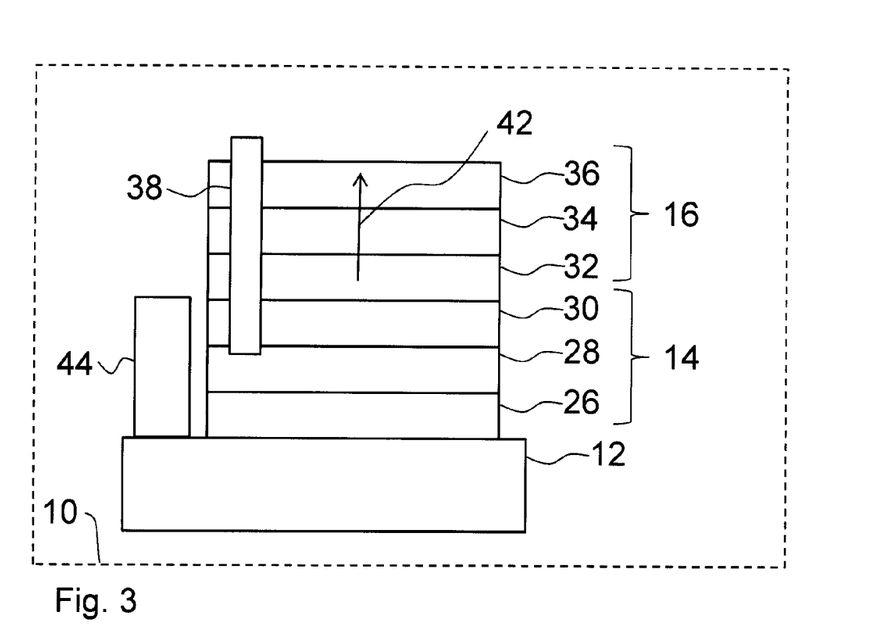
FIG. 3 shows a schematic, partly cut illustration of a third embodiment of a vehicle heater which, at the same time, illustrates the monitoring method.

FIG. 3 shows a schematic, partly cut illustration of a third embodiment of a vehicle heater which, at the same time, illustrates the monitoring method.

The embodiment according to FIG. 3 differs from the embodiment according to FIG. 2 in that the heat exchanger 10 consists of an electrically conductive material, particularly of aluminium in this case. Therefore the heat conductor layer 14 is subdivided into a first insulating layer 26, the actual heating layer 28, and a second insulating layer 30 in this embodiment. Preferably all three components of the heat conductor layer are sprayed on using a thermal spraying method. Referring to the above illustration of the heat conductor layer altogether designated by 14, a sensor layer collectively designated by 16 is provided which is also sprayed on by means of a thermal spraying method, and in turn comprises three components in this embodiment. Directly above the second insulating layer 30 there is a first electrically conductible contact layer 32 sprayed onto a layer 34 of a material having a negative temperature coefficient. The layer 34 may—without being limited thereto—particularly consist of one of the materials suggested for layers having a negative temperature coefficient in the general part of the description. Directly on the layer 34 having a negative temperature coefficient a second, upper, electrically conductible contact layer 36 was sprayed on. For example, a smouldering point leads to local heating which is so extreme that it can be detected by detecting the measurement signal between the upper contact layer 36 and the lower contact layer 32 via a measuring device 18 as shown in FIG. 2. In FIG. 3, furthermore, an electrically conductive gas duct 38 is illustrated as developing in case of an arc ignition originating in the actual heating layer 28. The gas duct 38 permeates or punctures the other layers on the side of the heat conductor layer 14 averted from the main body and results in a current flow through the layer 34 having a negative temperature coefficient, namely in the direction of its surface normal 42. This current flow can also be detected by a measuring device connected between the lower contact layer 32 and the upper contact layer 36.

Figure 4:
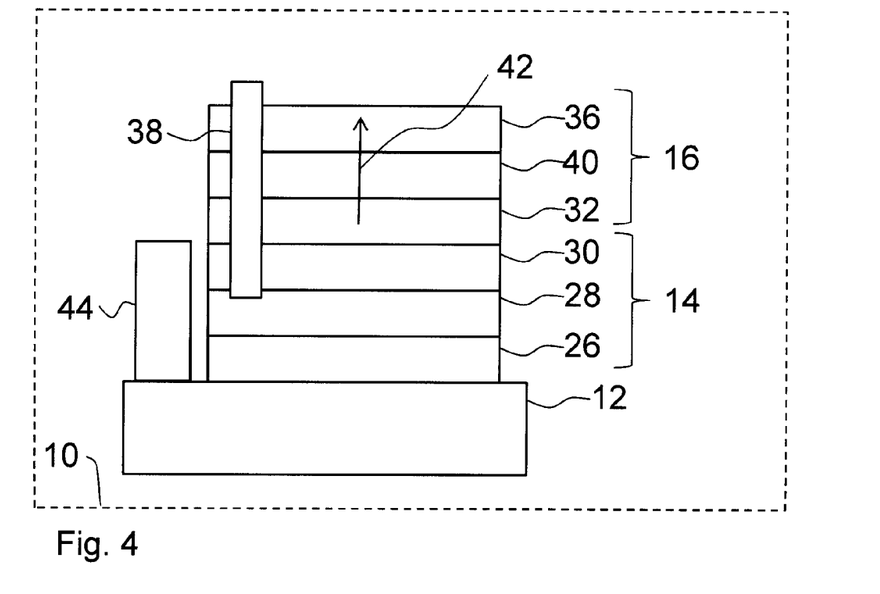
FIG. 4 shows a schematic, partly cut illustration of a fourth embodiment of a vehicle heater which, at the same time, illustrates the monitoring method.

FIG. 4 shows a schematic, partly cut illustration of a fourth embodiment of a vehicle heater which, at the same time, illustrates the monitoring method.

The embodiment illustrated in FIG. 4 differs from the embodiment according to FIG. 3 in that the sensor layer 16 comprises an insulating layer 40 instead of the layer 34 having a negative temperature coefficient shown in FIG. 3. Even with such a simplified arrangement it is possible to reliably detect a gas duct 38 caused by an arc ignition with the aid of a measuring device connected between the lower contact layer 32 and the upper contact layer 36 (not shown in FIG. 4) because in such a case the insulating layer 40 is permeated by the gas duct 38. Particularly if the main body 12 is an electrically nonconductive main body the insulating layer 26 may potentially be omitted. Apart from that the lower contact layer 32 and the upper insulating layer 30 may potentially also be omitted, the measurement signal being detected between the actual heating layer 28 and the upper contact layer 36 in this case.

Figure 5:
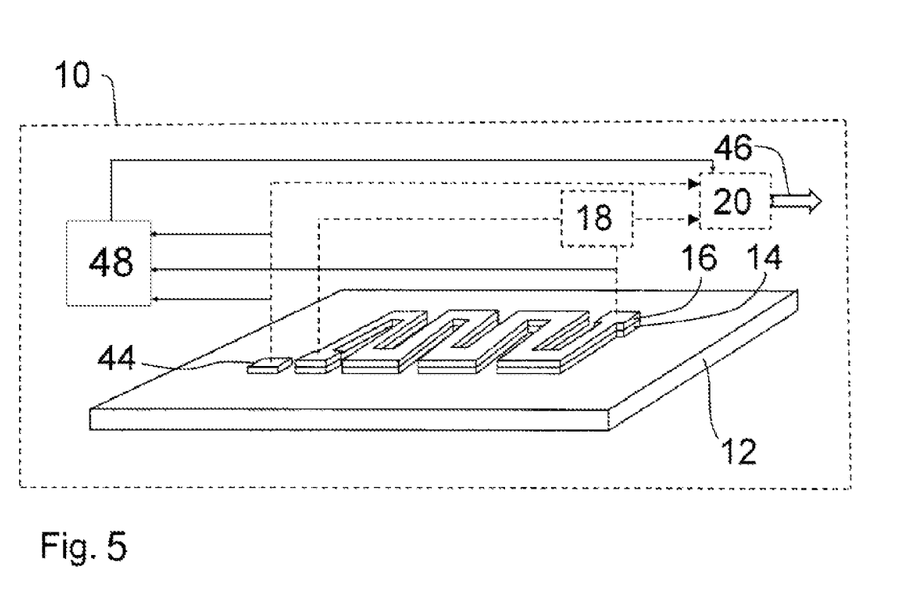
FIG. 5 shows a schematic, partly perspective illustration of a fifth embodiment of a vehicle heater which, at the same time, illustrates the monitoring method.

FIG. 5 shows a schematic, partly perspective illustration of a fifth embodiment of a vehicle heater which, at the same time, illustrates the monitoring method.

The embodiment shown in FIG. 5 is, in wide parts, consistent with the embodiment according to FIG. 1 which is why the components already explained there will not be described again here. According to the embodiment of FIG. 5 it is contemplated that the temperature monitoring device 16, 18, 20, 44, 48 comprises a controller 20 programmable with or operable by software, and switching components 48 operating independent of the software. These switching components 48 are designed to perform an emergency measure independent of the software in case of the occurrence of at least one of the malfunctions to be distinguished according to the invention. Such an emergency measure may, particularly, be a reduction of the heat output, for example, the power supply to the heat conductor layer 14 may be completely or partly interrupted by opening a transistor or another semiconductor switch ranking among the switching components (not shown). The switching components 48 may, for example, comprise one or more operational amplifiers provided for the purpose of comparison which compare measurement values supplied by the sensors or detected voltages to values or voltages provided by reference voltage sources to be able to at least detect the states to be distinguished according to the invention. This is indicated by the associated input signals of the switching components 48 only schematically shown in FIG. 5. In this embodiment the switching components 48 are further capable of providing the controller 20 with a signal (for example, a specific voltage value) in case of the occurrence of a malfunction so that the controller 20 can fulfil the Identification function preferred the according to the invention. In this way the last reported or encountered condition can be retrieved prior to a renewed activation, i.e. a new operating cycle of the vehicle heater, even if an irreversible malfunction which occurred was not detected via the controller 20 but via the switching components 48. In case of an irreversible malfunction then a renewed activation will be prevented so that the vehicle heater will remain permanently deactivated in such a case until an exchange or repair has taken place. The capability of transmitting a corresponding signal from the switching components 48 to the controller 20 is indicated by an associated signal line in FIG. 5. The switching components 48 may, either redundantly or exclusively, provide functions which are performed by the controller 20 or also the measuring device 18 in the embodiment according to FIG. 1. In any case, the switching components 48 provide for a certain independence from the software which may be desirable particularly for (highly) security-relevant functions.

As mentioned, the respective sensor layers 16 (and preferably also the other layers discussed here) are preferably applied to the main body 12 by means of a thermal spraying method. However, also solutions in which the respective sensor layer 16 is manufactured as a separate component and then fixed on the heat conductor layer 14, for example by means of clamping, adhering or thermal bonding by means of a heat conducting foil are contemplable within the scope of the invention. If the sensor or the sensor layer 16 are manufactured as a separate component it is, of course, also possible to use common burning-in processes or high-melting and/or non-sprayable materials for manufacturing the sensor layer 16 in case of heat sensitive main bodies.

The abovementioned insulating layers 26, 30 and 40 may, for example, be aluminium oxide layers, while the heat conductor layer 14 or the actual heating layer 28 may, for example, be realised by a nickel chromium layer. As contact layers 32, 36, for example, copper layers may be used, and as the layer 34 having a negative temperature coefficient, apart from the materials already mentioned in the general part of the description, for example, also a layer of titanium oxide doped with chromium oxide is contemplable.

The features disclosed in the above description, in the drawings as well as in the claims may be important for the realisation of the invention both individually as well as in any combination.

LIST OF NUMERALS 10 vehicle heater
12 main body/heat exchanger
14 heat conductor layer
16 sensor layer
18 measuring device
20 controller
22 layer having a negative temperature coefficient
24 contact layer
26 first insulating layer
28 actual heating layer
30 second insulating layer
32 first contact layer
34 material having a negative temperature coefficient
36 second contact layer
38 gas duct caused by a possible electric arc
40 insulating layer
42 surface normal of the sensor layer
44 sensor element detecting local temperatures
46 signal indicating the condition
48 switching components

The invention claimed is:

1. A vehicle heater comprising:
a main body including a non-intrinsically safe heat conductor layer; and
a temperature monitoring device monitoring a temperature of the heat conductor layer, the temperature monitoring device including a processor programmed to:
identify operation in at least one of the three following states based on the temperature of the heat conductor layer: normal operation, reversible malfunction, and irreversible malfunction;
store the identified state of the heat conductor layer detected by the temperature monitoring device; and retrieve and evaluate the last stored state before a renewed activation of the vehicle heater and prevent the renewed activation when the retrieved state is the irreversible malfunction state.

2. The vehicle heater according to claim 1, in which the temperature monitoring device includes a sensor element detecting temperatures of the heat conductor layer indicative of reversible malfunctions.

3. The vehicle heater according to claim 1, in which the temperature monitoring device includes a sensor layer which is, at least in parts, proximal the heat conductor layer for detecting irreversible malfunctions.

4. The vehicle heater according to claim 3, in which the sensor layer is a thermal sprayed layer.

5. The vehicle heater according to claim 3, in which the sensor layer includes, at least in sections, a resistance or impedance characteristic including a positive temperature coefficient.

6. The vehicle heater according to claim 3, in which the sensor layer includes, at least in sections, a resistance or impedance characteristic including a negative temperature coefficient.

7. The vehicle heater according to claim 1, in which the temperature monitoring device generates a signal indicating a normal operation when a first temperature threshold value is not exceeded by a detected temperature of a medium heated by the heat conductor layer.

8. The vehicle heater according to claim 1, in which the temperature monitoring device includes a controller programmable or operable with software and at least one switching component operating independent of the software which performs an emergency measure independent of the software in case of the occurrence of one of the malfunctions.

9. A method for monitoring a vehicle heater, said method comprising:
monitoring a temperature of a heat conductor layer of the vehicle heater, and identifying one of at least the three following states based on the monitored temperature: normal operation, reversible malfunction, and irreversible malfunction;
storing the identified state of the heat conductor layer; and
retrieving the last identified state of the heat conductor layer prior to activation of the heater and preventing a renewed activation of the vehicle heater when the retrieved state corresponds to the irreversible malfunction state.

10. The method according to claim 9, including detecting the reversible malfunction state using a sensor element detecting temperatures proximal the heat conductor layer.

11. The method according to claim 9, including detecting the irreversible malfunction state using a sensor layer which is, at least in sections, proximal the heat conductor layer.

12. The method according to claim 10, wherein the signal for the irreversible malfunction is generated when the detected temperatures are about 1000° C.

13. The vehicle heater according to claim 1, in which the signal corresponding to an irreversible malfunction is generated when a detected temperature is about 1000° C.

14. The method according to claim 11, wherein the signal for the irreversible malfunction is generated when the detected temperatures are about 1000° C.

* * * * *